US005531419A

United States Patent [19]

Gustafsson et al.

[11] Patent Number: 5,531,419

[45] Date of Patent: Jul. 2, 1996

[54] MAST BASE, ESPECIALLY FOR A TEMPORARILY ERECTED MAST

[75] Inventors: Karl M. Gustafsson, Skellefteå; Herman P. S. Sylvan, Lidingö, both of Sweden

[73] Assignees: Cue Dee Produktor AB, Robertsfors; Telefonaktiebolaget L M Ericsson, Stockholm, both of Sweden

[21] Appl. No.: 290,902

[22] PCT Filed: Feb. 26, 1993

[86] PCT No.: PCT/SE93/00170

§ 371 Date: Aug. 23, 1994

§ 102(e) Date: Aug. 23, 1994

[87] PCT Pub. No.: WO93/17208

PCT Pub. Date: Sep. 2, 1993

[30] Foreign Application Priority Data

Feb. 28, 1992 [SE] Sweden ................................ 92 00608

[51] Int. Cl.$^6$ ...................................................... F16M 13/00

[52] U.S. Cl. ............................................ 248/519; 343/882

[58] Field of Search .................................... 248/519, 523, 248/678, 346, 188.5; 52/146, 148; 343/878, 880, 882

[56] References Cited

U.S. PATENT DOCUMENTS

| | | | |
|---|---|---|---|
| 2,998,106 | 8/1961 | Aust et al. . | |
| 3,457,685 | 7/1969 | Stein . | |
| 3,714,660 | 1/1973 | Scrafford et al. | 343/880 X |
| 4,185,288 | 1/1980 | Dosch et al. | 343/880 X |

FOREIGN PATENT DOCUMENTS

| | | |
|---|---|---|
| 3812270 | 5/1989 | Germany . |
| 409320 | 8/1979 | Sweden . |

OTHER PUBLICATIONS

Brochure TLM–250, TLM–300, TLM–350, *Transportable Lattice Masts*, Johsson Processmekanik AB; Sep., 1990.

*Primary Examiner*—Ramon O. Ramirez
*Attorney, Agent, or Firm*—Browdy and Neimark

[57] ABSTRACT

A mast base comprises a body, formed partly by a generally rectangular container (12), provided with four upper corner fittings (13), located at the upper end thereof, and with four lower corner fittings (14), located at the lower end thereof, and partly by a stationary supporting frame (15), placed upon the container (12) and attached to the four upper corner fittings (13). In order to support the body (12, 15) in a stable position on the ground, four supporting legs (16) are provided, which may be placed in positions, in which they project laterally each from one corner of the body (12, 15). Each supporting leg (16) is composed of one lower arm (18), at its inner end connected to a lower corner fitting (14), and one upper arm (17), at its inner end connected to the stationary supporting frame (15) or to an upper corner fitting (13). Moreover, at its outer end, each supporting leg (16) is provided with a supporting foot (32).

17 Claims, 6 Drawing Sheets

MAST BASE, ESPECIALLY FOR A TEMPORARILY ERECTED MAST

Figure 1:
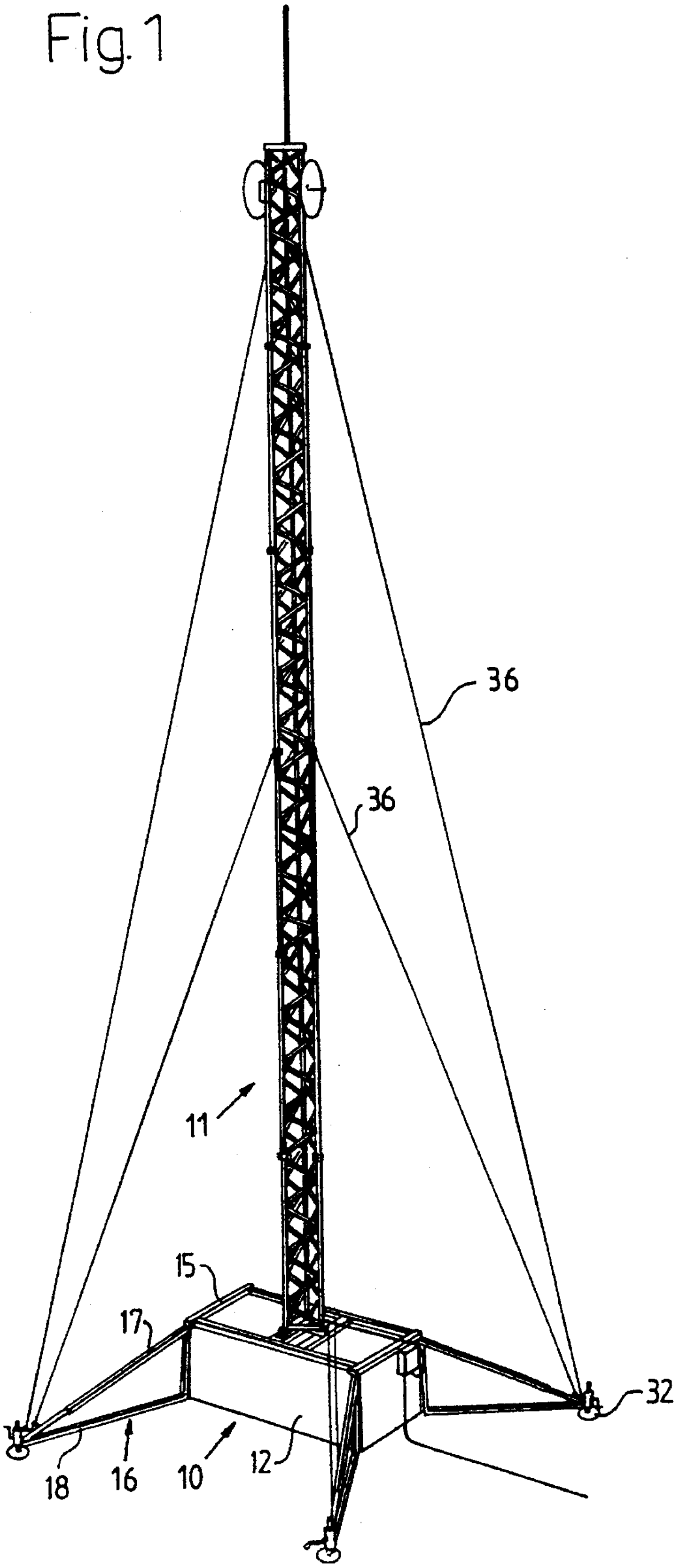

The present invention relates to a mast base, especially for a temporarily erected mast.

Within the telecommunication field, it is often required to erect antenna masts temporarily for shorter or longer periods of time. Since the masts in question may have a height of several tenths of meters, for instance 30 to 40 meters, although the masts are intended to be erected only temporarily, it is necessary to place them upon a highly stable base. For this reason, even in connection with temporarily erected masts, it has been common practice to utilize a stationary foundation, formed by a mast base which is firmly anchored in the ground and which is of a kind similar to that utilized for permanently erected masts. However, a mast base, which is firmly anchored in the ground, is unfavourable in several respects. Firstly, both the construction as well as a subsequent removal of such a mast base is very time-consuming and costly. Additionally, the use of such a mast base implies a substantial penetration into the ground, which is totally unacceptable in certain environmentally sensitive regions, such as in mountain regions or in costal regions where the rock is exposed. In order to avoid the above disadvantages, it has been proposed to utilize a transport vehicle of special design as a mast base for a temporarily erected mast. However, such a transport vehicle is very expensive. Moreover, it does not offer a sufficiently stable foundation for a mast of the abovementioned high height to permit the mast to remain erected thereon unattended during any longer periods of time.

The invention has for its purpose to provide an improved mast base which avoids the above disadvantages and is well suited to be used for supporting a temporarily erected mast of high height also during extended periods of time and which, if so desired, may be utilized also to support a permanently erected mast without requiring any frequent attendance.

In accordance with the invention, for the above purpose, there is proposed a mast base, primarily characterized in that it comprises a body, formed partly by a generally rectangular container, provided with four upper corner fittings, located at the upper end thereof, and with four lower corner fittings, located at the lower end thereof, and partly by a stationary supporting frame, placed upon the container and attached to the four upper corner fittings of the container, said mast base further comprising four supporting legs, which are intended to support the body in a stable position on the ground and arranged to be placed in positions, in which they project laterally each from one corner of the body, and which are composed each of one lower arm, at its inner end connected to a lower corner fitting of the container, and one upper arm, at its inner end connected to the stationary supporting frame or to an upper corner fitting of the container, each supporting leg being provided, at its outer end, with a supporting foot, by means of which it may be placed resting on the ground.

The invention permits the body of the mast base to be made from a container of standard design, normally intended for transportation purposes, and a supporting frame, mounted on said container. Hereby the body of the mast base may be transported to the desired site on a vehicle of commonly occuring kind, suited for the transportation of such a container. Moreover, the invention permits the body of the mast base to be erected in a stable position without any penetration into the ground. In this connection, it could be mentioned that any required stay wires for a mast placed upon the mast base may be anchored to outer portions of the supporting legs. Hereby, it is also possible to avoid the prior need for anchoring such stay wires to special attachments mounted in the ground.

Figure 2:
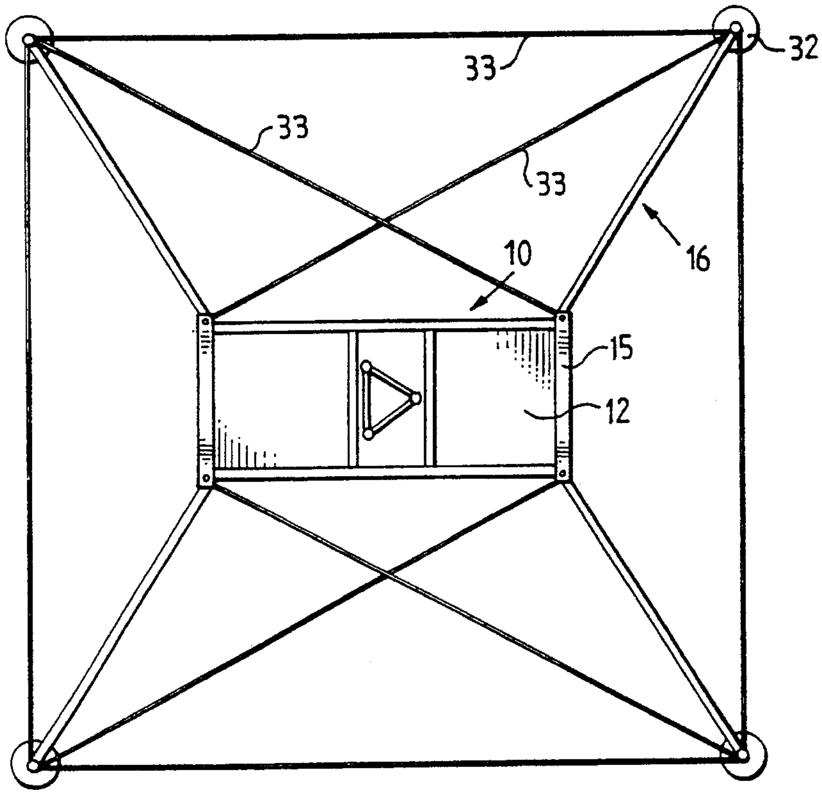
Figure 3:
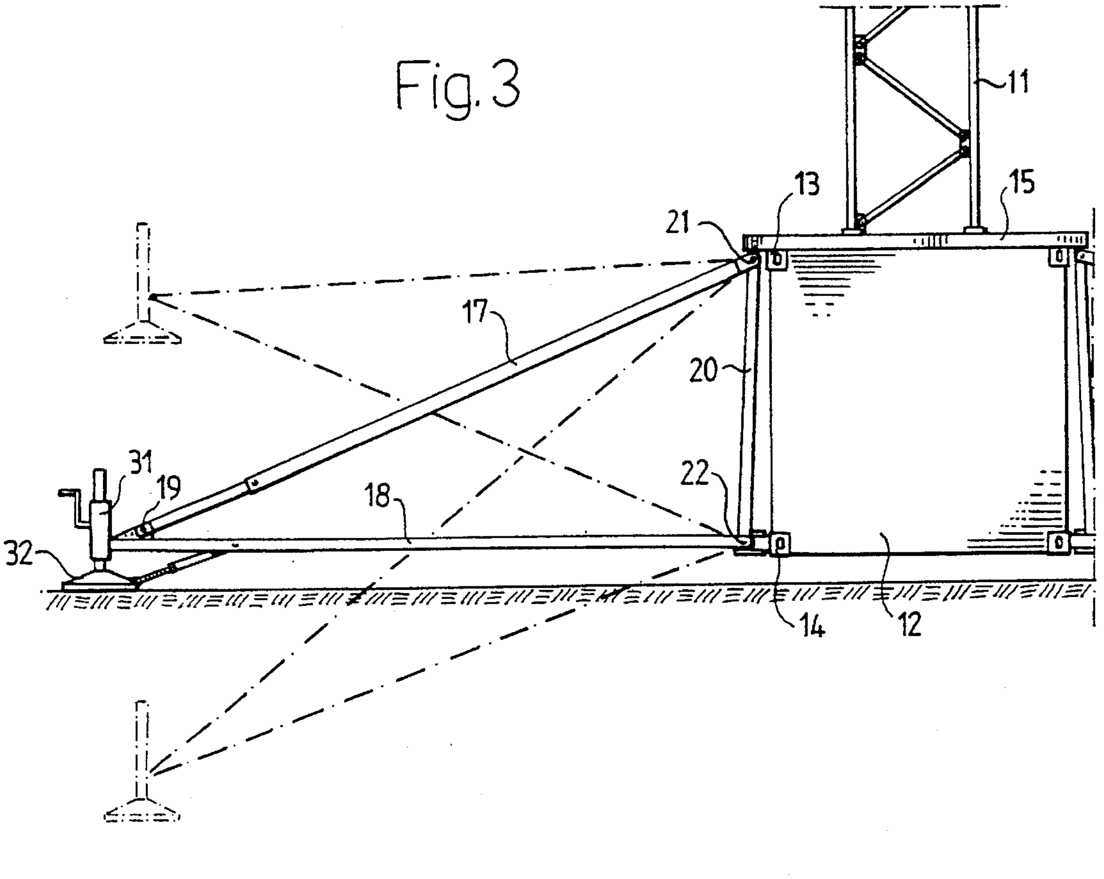
Figure 4:
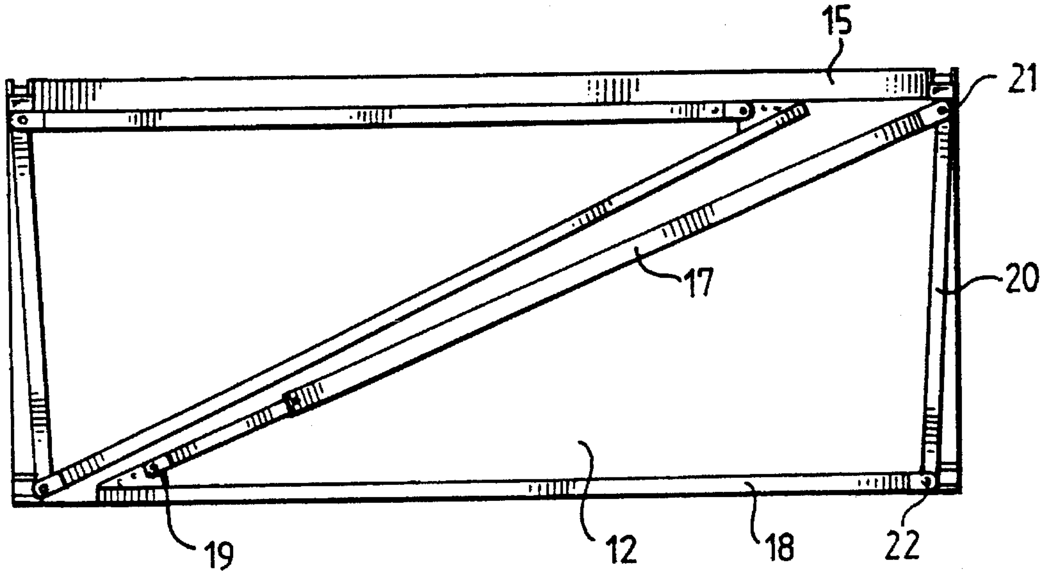
Figure 5:
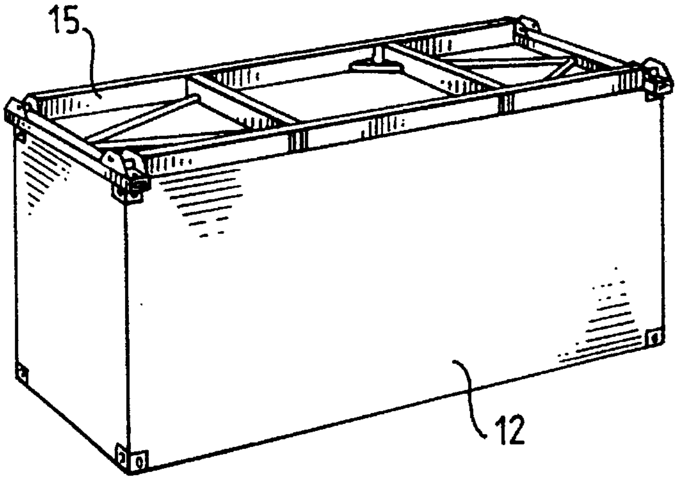
Figure 6:
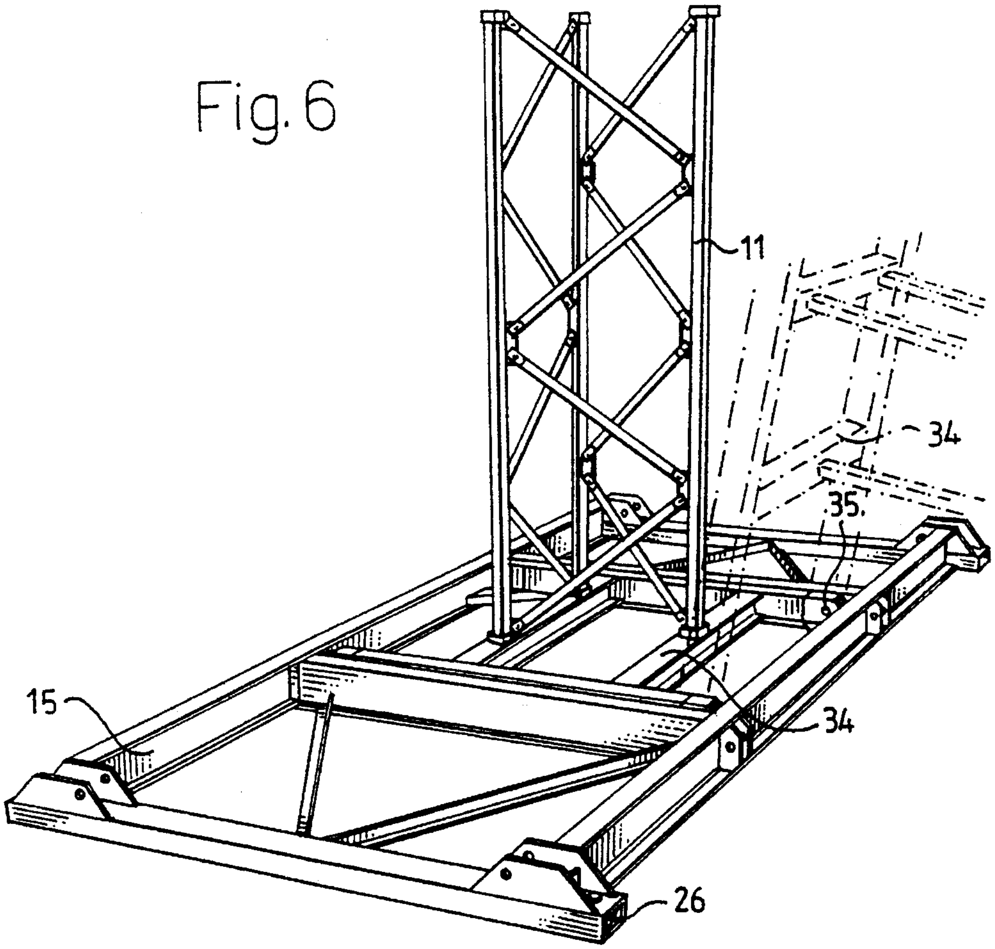
Figure 7:
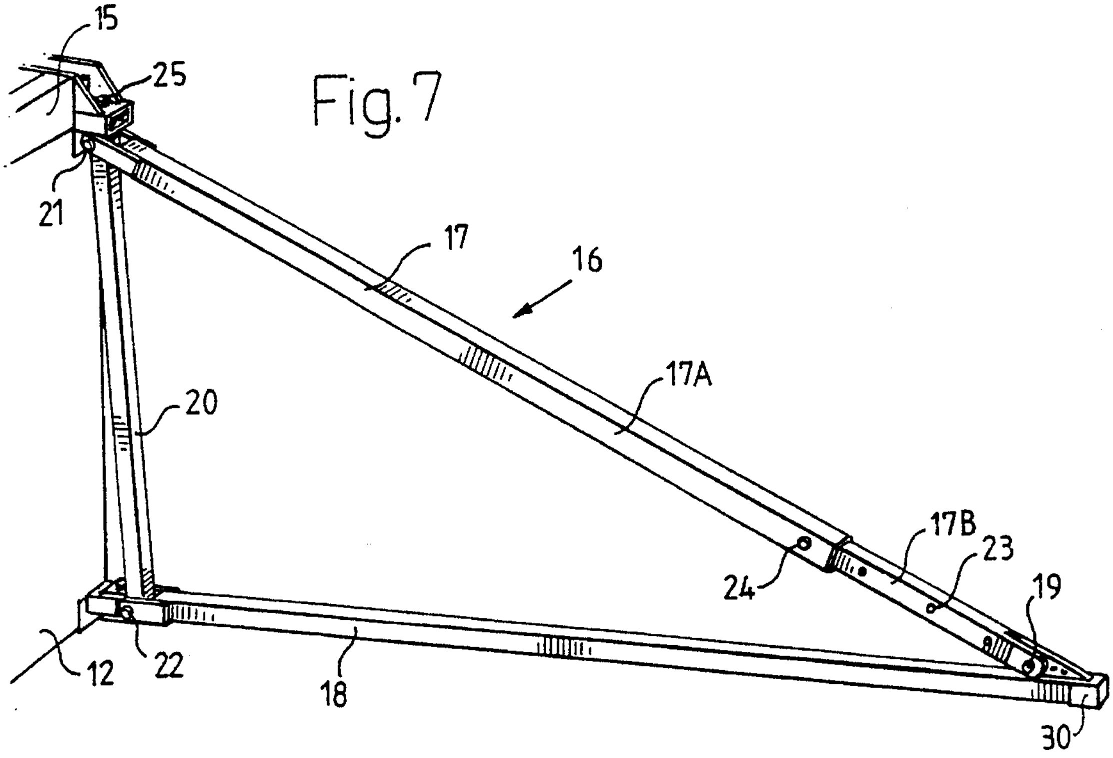
Figure 8:
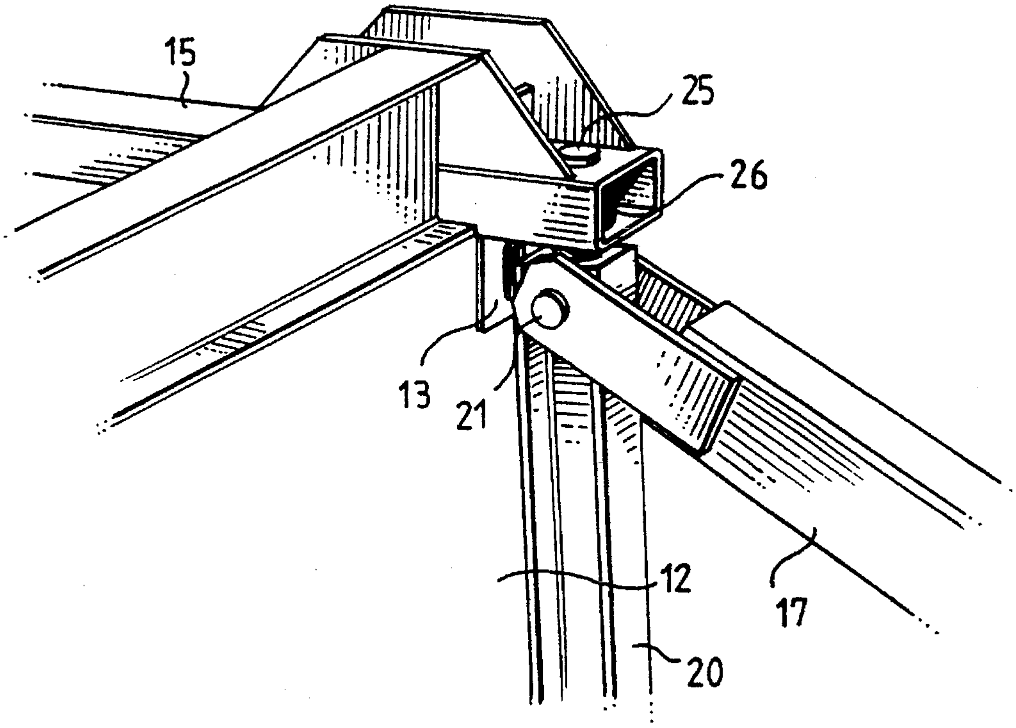
Figure 9:
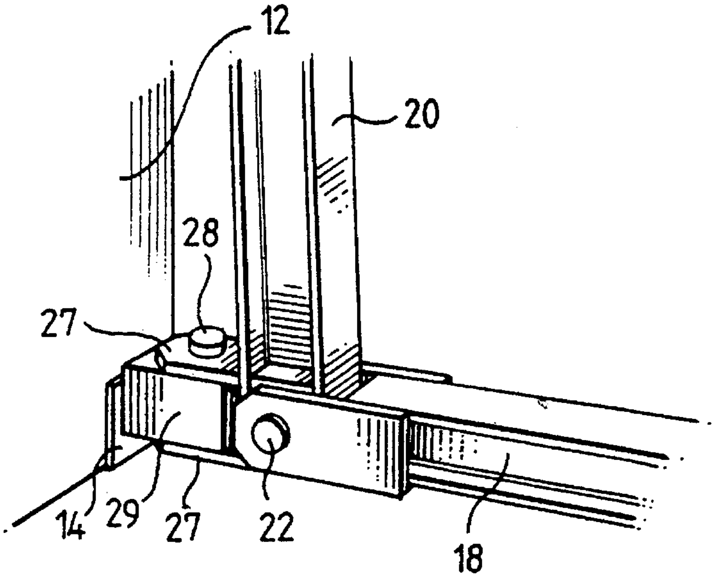
Figure 10:
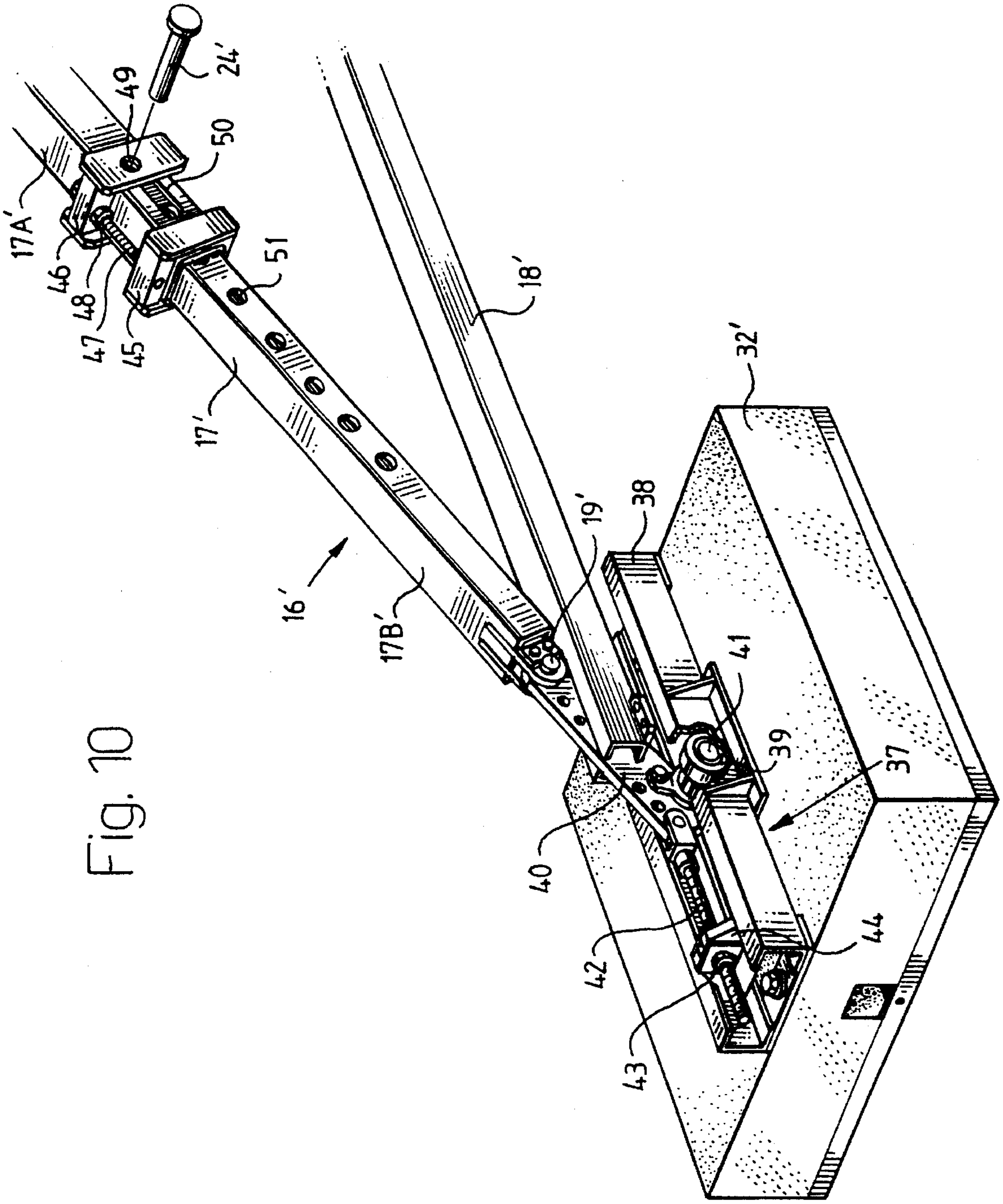

Additional characteristic features of the invention will appear from the subclaims and the following detailed specification, in which the invention is described in further detail with reference to the accompanying drawings, in which:

FIG. 1 shows a diagrammatic perspective view of a mast base according to an embodiment of the invention, selected by way of example, and an antenna mast erected on the mast base, FIG. 2 shows a diagrammatic plan view of the mast base according to FIG. 1, FIG. 3 shows a diagrammatic partial end view of the mast base according to FIG. 1, also illustrating a lower portion of the mast, FIG. 4 shows a diagrammatic side elevation of the mast base according to FIG. 1, showing supporting legs of the mast base swung into positions along a long side of the body of the mast base and with supporting feet, mounted at the outer ends of the supporting legs and shown in FIGS. 1 to 3, removed, FIG. 5 shows a perspective view of the body of the mast base, which consists of a generally rectangular container of standard design and a stationary supporting frame, mounted on said container, FIG. 6 shows a perspective view, on an enlarged scale, of the stationary supporting frame and a movable supporting frame for the mast, pivotally mounted on said stationary frame, also illustrating a lower mast section, mounted on the movable supporting frame, FIGS. 7, 8 and 9 show partial perspective views, illustrating the construction and mounting of the supporting legs of the mast base in greater detail, and FIG. 10 is a partial perspective view, showing an outer portion of a supporting leg of modified construction and a supporting foot connected thereto and likewise of modified construction.

In FIG. 1, reference numeral 10 generally designates a mast base and reference numeral 11 generally designates an antenna mast erected thereon. Mast base 10 comprises a body, formed partly by a generally rectangular container 12 of a standard type, commonly utilized for transportation purposes, which is provided with four upper corner fittings 13 at its upper end and with four lower corner fittings 14 at its lower end, and partly by a stationary supporting frame 15, placed upon container 12 and fastened to the four upper corner fittings 13 of the container.

In order to support the body of the mast base formed by container 12 and supporting frame 15 in a stable position on the ground, there are provided four supporting legs, generally designated 16, which are connected to the body of the mast base each at one corner thereof. Each one of these supporting legs has an upper arm 17 and a lower arm 18. These two arms 17 and 18 are pivotally connected to each other at their outer ends by means of a pivot joint 19, while, at their inner ends, they are pivotally connected each to one end portion of an approximately vertical connecting member 20 by means of a pivot joint 21 and 22, respectively. As may best be seen from FIG. 7, the upper arm 17 is composed of two members 17A and 17B, which are mounted longitudinally displaceable relatively to each other in telescopic manner and which may be locked in different positions relatively to each other by means of a locking pin 24, which may be inserted through a pair of aligned holes in two opposite walls of member 17A and a selected through hole 23 in member 17B. As a consequence, the length of arm 17 may be adjusted in steps.

At its upper end, connecting member 20 is provided with a pivot pin 25 (FIG. 8), which projects in an upward direction and by means of which said member is pivotally mounted in a bearing sleeve 26 in supporting frame 15, while, at its lower end, it is provided with two laterally projecting bearing tongues 27 (FIG. 9) by means of which it is pivotally mounted on a pivot pin 28, carried by a mounting 29, attached to a lower corner fitting 14.

Moreover, at its outer end, each supporting leg 16 is also provided with a mounting 30 for a foot 32, which may be vertically adjusted, for instance by the aid of a rack jack 31, and by means of which the supporting leg may be placed resting on the ground.

The construction of the supporting legs 16 and the manner of connecting them to the body of the mast base above described and shown in FIGS. 1 to 9 permits the supporting legs to be swung around vertical pivot axes, defined by pivot pins 25 and 28, from the inner positions shown in FIG. 4, in which they extend along the long sides of the body of mast base 10 formed by container 12 and supporting frame 15, to outer positions, in which they extend in laterally outward directions from the body of the mast base as shown in FIGS. 1, 2 and 3. In the case illustrated in FIG. 2, supporting legs 16 are assumed to be located in positions such as to cause the supporting feet 32, mounted at their free ends, to be located each at one corner of a square. In FIG. 2, there is also shown a number of stay wires 33, which are located on the ground level or close thereto and by means of which the supporting legs are stayed in the positions shown. By varying the adjusted length of the upper arms 17 of supporting legs 16, it is possible to raise and lower the outer ends of supporting legs 16 as indicated in dash-dotted lines in FIG. 3, in order hereby to permit a stepwise coarse adjustment of the vertical positions of supporting feet 32. Moreover, the vertical positions of supporting feet 32 may be fine-adjusted by means of rack jacks 31.

Mast 11 may be mounted directly on the stationary supporting frame 15, provided that said frame is designed in a manner suitable for said purpose. Alternatively, as shown in FIG. 6, the mast may be mounted on a movable supporting frame 34, at its one end pivotally connected to stationary supporting frame 15 for pivotal movement relatively to the latter around an approximately horizontal pivot axis, formed by a pair of pivot pins 35. When mounting mast 11, the movable supporting frame 34 may be swung around pivot pins 35 to the approximately upright position shown in dash-dotted lines, in order to permit the mast to be attached to supporting frame 34 while lying down. The mast may then be raised to a vertical position during simultaneous rotation of supporting frame 34 to its horizontal position shown in full lines and in which said frame may be locked in any suitable manner.

As shown in FIG. 1, when erected on mast base 10, mast 11 may suitably be stayed laterally by means of a number of stay wires 36, having their lower ends anchored to outer end portions of supporting legs 16.

If required, when placed in position, the mast base may easily be provided with any required ballast, which may be placed within or upon container 12. Furthermore, container 12 may be utilized as an apparatus room for any desired equipment.

FIG. 10 shows an outer portion of a supporting leg 16' of modified construction and a supporting foot 32' connected thereto and likewise of modified construction.

Supporting foot 32' consists of a reinforced concrete slab, at its upper side provided with a mounting, generally designated 37, for supporting legs 16'. This mounting 37 comprises two opposite parallel U-profile members 38, serving as guides for two supporting rollers 39, which are carried by a transverse shaft 41, mounted at an outer end portion 40 of the lower arm 18' of supporting leg 16', preferably by means of a ball joint. Reference numeral 42 designates a set bolt and reference numeral 43 designates nuts mounted thereon and by means of which portion 40 may be locked in an adjusted position in relation to a transverse fixed flange member 44 of mounting 37.

The upper arm 17' of supporting leg 16' is pivotally connected to the lower arm 18' by means of a pivot pin 19' and consists of two members 17A' and 17B' which are mounted longitudinally displaceable relatively to each other in telescopic manner and which may be locked to each other in different relative positions to permit an adjustment of the length of arm 17'. While the length of the upper arm 17 of supporting leg 16, previously described, may be adjusted in steps, the length of arm 17' of supporting leg 16' is however continuously adjustable. This has been facilitated by providing member 17A' with a yoke 45, which is rigidly secured to the outer end of said member, and a displaceable yoke 46, which may be locked at an adjustable distance from yoke 45 by a set bolt 47 and nuts 48 threaded thereon. Hereby, locking pin 24', which is intended to extend through a circular hole 49 in each of the two opposite side pieces of yoke 46, an elongate hole 50 in each side wall of member 17A', and a selected circular hole 51 in each side wall of member 17B', may be displaced in the longitudinal direction of member 17A' a distance corresponding to the length of the elongated hole 50, which should have a length amounting to at least the sum of the spacing of holes 51 and the diameter of said holes.

The invention is not restricted to the embodiment above described and shown in the drawings. Instead, many other embodiments are feasible within the scope of the invention. For instance, it could be mentioned that the supporting legs do not need to be pivotally connected to the body of the mast base for the purpose of permitting them to be swung in relation to said body from positions in which they project therefrom to positions in which they extend along said body. Moreover, the upper arms of the supporting legs do not need to be connected to the container through the stationary supporting frame. Instead, they may be connected to the container each through an upper corner fitting of the container.

We claim:

1. A mast base, especially for a temporarily erected mast, comprising:

a body, formed partly by a generally rectangular container (12), provided with four upper corner fittings (13), located at an upper end thereof, and with four lower corner fittings (14), located at a lower end thereof, and partly by a stationary supporting frame (15), placed upon the container (12) and attached to the four upper corner fittings (13) of the container (12); and four supporting legs (16) supporting the body (12,15) in a stable position on the ground and arranged to be placed in positions, in which they project laterally each from one corner of the body (12,15), and which each includes one lower arm (18), at its inner end connected to a lower corner fitting (14) of the container (12), and one upper arm (17), at its inner end connected to the stationary supporting frame (15) or to an upper corner fitting (13) of the container (12), each supporting leg (16) being provided, at its outer end, with a supporting foot (32), by means of which it may be placed resting on the ground.

2. The mast base according to claim 1, wherein the supporting feet (32) are mounted vertically adjustable on the supporting legs (16).

3. A mast base, especially for a temporarily erected mast, comprising;

a body, formed partly by a generally rectangular container (12), provided with four upper corner fittings (13), located at an upper end thereof, and with four lower corner fittings (14), located at a lower end thereof, and partly by a stationary supporting frame (15), placed upon the container (12) and attached to the four upper corner fittings (13) of the Container (12); and four supporting legs (16) supporting the body (12,15) in a stable position on the ground and arranged to be placed in positions, in which they project laterally each from one corner of the body (12,15) and which each includes one lower arm (18), at its inner end connected to a lower corner fitting (14) of the container (12), and one upper arm (17), at its inner end connected to the stationary supporting frame (15) or to an upper corner fitting (13) of the container (12), each supporting leg (16) being provided at its outer end, with a supporting form (32), by means of which it may be placed resting on the ground; wherein at their inner ends, the two arms (17,18) of each supporting leg (16) are connected to each other by means of an approximately vertical connecting member (20).

4. A mast base according to claim 3, characterized in that the supporting feet (32) are mounted vertically adjustable on the supporting legs (16).

5. A mast base according to claim 4, characterized in that said mast base also comprises a movable supporting frame (34), mounted on the stationary supporting frame (15) and pivotally movable relatively to the stationary supporting frame around an approximately horizontal axis (35).

6. A mast base according to claim 3, characterized in that said mast base also comprises a movable supporting frame (34), mounted on the stationary supporting frame (15) and pivotally movable relatively to the stationary supporting frame around an approximately horizontal axis (35).

7. A mast base, especially for a temporarily erected mast, comprising:

a body, formed partly by a generally rectangular container (12), provided with four upper corner fittings (13), located at an upper end thereof, and with four lower corner fittings (14), located at a lower end thereof, and partly by a stationary supporting frame (15), placed upon the container (12) and attached to the four upper corner fittings (13) of the container (12); and four supporting legs (16) supporting the body (12,15) in a stable position on the ground and arranged to be placed in positions, in which they project laterally each from one corner of the body (12,15), and which each includes one lower arm (18), at its inner end connected to a lower corner fitting (14) of the container (12), and one upper arm (17), at its inner end connected to the stationary supporting frame (15) or to an upper corner fitting (13) of the container (12), each supporting leg (16) being provided, at its outer end, with a supporting foot (32), by means of which it may be placed resting on the ground; wherein at least one arm (17) of each supporting leg (16) is composed of two members (17A, 17B), which are mounted longitudinally displaceable relatively to each other and which are lockable in different relative displacement positions, and wherein at their outer ends, the two arms (17, 18) are pivotally connected to each other for pivoting movement relatively to each other around a horizontal transverse pivot axis (19), while, at their inner ends, they are each pivotally movable relatively to the body of the mast base around a horizontal transverse axis (21,22).

8. A mast base according to claim 7, characterized in that the supporting feet (32) are mounted vertically adjustable on the supporting legs (16).

9. A mast base according to claim 7, characterized in that, at their inner ends, the two arms (17,18) of each supporting leg (16) are connected to each other by means of an approximately vertical connecting member (20).

10. A mast base according to claim 9, characterized in that the supporting feet (32) are mounted vertically adjustable on the supporting legs (16).

11. A mast base according to claim 8, characterized in that said mast base also comprises a movable supporting frame (34), mounted on the stationary supporting frame (15) and pivotally movable relatively to the stationary supporting frame around an approximately horizontal axis (35).

12. A mast base according to claim 10, characterized in that said mast base also comprises a movable supporting frame (34), mounted on the stationary supporting frame (15) and pivotally movable relatively to the stationary supporting frame around an approximately horizontal axis (35).

13. A mast base according to claim 9, characterized in that said mast base also comprises a movable supporting frame (34), mounted on the stationary supporting frame (15) and pivotally movable relatively to the stationary supporting frame around an approximately horizontal axis (35).

14. A mast base according to claim 7, characterized in that said mast base also comprises a movable supporting frame (34), mounted on the stationary supporting frame (15) and pivotally movable relatively to the stationary supporting frame around an approximately horizontal axis (35).

15. A mast base, especially for a temporarily erected mast, comprising:

a body, formed partly by a generally rectangular container (12), provided with four upper corner fittings (13), located at an upper end thereof, and with four lower corner fittings (14), located at a lower end thereof, and partly by a stationary supporting frame (15) placed upon the container (12) and attached to the four upper corner fittings (13) of the container (12);

four supporting legs (16) supporting the body (12,15) in a stable position on the ground and arranged to be placed in positions, in which they project laterally each from one corner Of the body (12, 15), and which each includes one lower arm (18), at its inner end connected to a lower corner fitting (14) of the container (12), and one upper arm (17), at its inner end connected to the stationary supporting frame (15) or to an upper corner fitting (13) of the container (12), each supporting leg (16) being provided, at its outer end, with a supporting foot (32) by means of Which it may be placed resting on the ground; and a movable supporting frame (34), mounted on the stationary supporting frame (15) and pivotally movable relatively to the stationary supporting frame around an approximately horizontal axis (35).

16. The mast base according to claim 15, wherein the supporting feet (32) are mounted vertically adjustable on the supporting legs (16).

17. A mast base, especially for a temporarily erected mast, comprising:

a body formed partly by a generally rectangular container (12), the container being of a standard cargo size and provided with four upper corner fittings (13) located at an upper end thereof, and with four lower corner fittings (14) located at a lower end thereof, and partly by a stationary supporting frame (15), placed upon the container (12) and attached to the four upper corner fittings (13) of the container (12) and serving to support the mast upon the container (12);

four supporting legs intended to support said body in a stable position on the ground, said supporting legs being arranged to be placed in positions in which they project laterally each from one corner of the body, each supporting leg being provided, at its outer end, with a supporting foot means for placing the supporting leg resting on the ground;

each supporting leg being composed of one lower arm (18), at its inner end connected to a respective one of the lower corner fittings (14) of the container (12), and one upper arm (17), at its inner end connected selectively to one of the stationary supporting frame (15) and to one of the upper corner fittings (13) of the container (12).

* * * * *